(12) United States Patent
Gleeson

(10) Patent No.: US 6,947,559 B2
(45) Date of Patent: Sep. 20, 2005

(54) RANDOM NUMBER GENERATOR BASED ON TURBULENT CONVECTION

(75) Inventor: James T. Gleeson, Kent, OH (US)

(73) Assignee: Kent State University, Kent, OH (US)

( * ) Notice: Subject to any disclaimer, the term of this patent is extended or adjusted under 35 U.S.C. 154(b) by 933 days.

(21) Appl. No.: 09/788,159

(22) Filed: Feb. 16, 2001

(65) Prior Publication Data

US 2001/0046293 A1 Nov. 29, 2001

Related U.S. Application Data

(60) Provisional application No. 60/183,447, filed on Feb. 18, 2000.

(51) Int. Cl.$^7$ ................................................. H04K 1/00
(52) U.S. Cl. .......................................... 380/41; 331/78
(58) Field of Search ...................... 380/41, 46; 331/78; 708/251, 255

(56) References Cited

U.S. PATENT DOCUMENTS

| | | | | |
|---|---|---|---|---|
| 5,394,256 A | * | 2/1995 | Yamada et al. ............... | 349/89 |
| 5,706,218 A | | 1/1998 | Hoffman ..................... | 364/717 |
| 5,896,163 A | * | 4/1999 | Tsuda et al. ................. | 347/255 |
| 6,215,874 B1 | | 4/2001 | Borza et al. .................. | 380/46 |
| 6,218,973 B1 | | 4/2001 | Barrett, Jr. et al. ......... | 341/143 |
| 6,249,009 B1 | * | 6/2001 | Kim et al. ................... | 250/580 |

OTHER PUBLICATIONS

Dennin et al☐☐"Patterns of electroconvection in a nematic liquid crystal".*

Johansson et al , Random Number Generator by Chatoic Double Scroll Oscillator on Chip, 1999.*

Stefanov et al, Optical Quantum Random Number Generator, Jun. 2, 1999.*

Kai et al., "Successive Transitions in Electrohydrodynamic Instabilities of Nematics," Supplements to Progress in Theoretical Physics, vol. 64, pp 212–43 (1978).

Heilmeier, et al., *Dynamic Scattering: A New Electrooptic Effect in Certain Classes of Nematic Liquid Crystals,* pp. 1162–1171, Jul., 1968, Proceedings of the IEEE, vol. 56, No. 7.

* cited by examiner

Primary Examiner—Gregory Morse
Assistant Examiner—Andrew L. Nalven
(74) *Attorney, Agent, or Firm*—Fay, Sharpe, Fagan, Minnich & McKee, LLP

(57) ABSTRACT

A method for generating random numbers includes the steps of providing a liquid crystal cell containing a liquid crystal material, wherein a potential difference is applied across said liquid crystal material to cause a chaotic turbulent flow. The resulting flow or physical result of the liquid crystal material is measured to generate a baseline measurement, and subsequently the at least one physical property is measured again to generate a plurality of reading measurements. Determining the difference between each of the reading measurements and the baseline measurement, and setting bits based on the differences generates a sequence of random numbers. An apparatus for generating random numbers is also disclosed. These truly random numbers may then be used to encrypt data prior to transmission.

12 Claims, 3 Drawing Sheets

RANDOM NUMBER GENERATOR BASED ON TURBULENT CONVECTION

This application claims benefit of pending U.S. Provisional Application No. 60/183,447 filed on Feb. 18, 2000.

TECHNICAL FIELD

This invention relates to generating truly random numbers. Random numbers are essential in generating "keys" for strong data encryption. Specifically, this invention relates to the use of nonlinear amplification of noise that is produced when a liquid is undergoing turbulent flow, to produce truly random numbers. More specifically, this invention relates to the use of nematic liquid crystals; that when subject to sufficiently strong electric fields, a spatio-temporally chaotic flow spontaneously forms. Under these circumstances, fluctuations in physical properties such as the light transmissivity of the liquid crystal are completely random, uncorrelated and unpredictable. Measurements of these fluctuations yield a stream of truly random numbers.

BACKGROUND OF THE INVENTION

The increasing ubiquity of confidential communications via open networks has created an urgent need for the strongest possible data encryption techniques. Modern encryption techniques rely on "keys." The encryption is only as strong as the key. If the key can be guessed by an attacker, the encryption is compromised. The less random the process for generating the key, the easier it is to guess. It is for this reason that generators that can produce truly random numbers are essential for data security.

One essential feature in protecting data encryption is the length of the key. If a key has few digits, it can be easily guessed, whether generated by a random process or not. A key must be changed at intervals shorter than are necessary to guess the key by exhaustive search. Since computing power is continually reducing the time needed for exhaustive searching of keys, random number generators must be able to produce numbers at a substantial rate.

Various prior art exists for generating random numbers. The most common are computer algorithms. While these are the easiest to implement, they are inherently only "pseudo-random." That is, they are not truly random, and often, if one can observe a sequence of numbers generated by such an algorithm, it is possible to deduce subsequent numbers. When more randomness is desired, combinations of different algorithms for producing pseudo-random numbers are combined. Other devices rely on fundamentally irregular natural processes, such as the thermal noise generated by all electrically resistive elements (Johnson noise), or the intrinsic unpredictability of the time between decays of radioactive nuclei. Both of these have drawbacks. While thermal noise is indeed random, before an actual number can be generated from this noise, it must be significantly amplified by electronic means. The bandwidth characteristics of the amplifier then play a significant role in the predictability of the resulting stream of numbers. Measuring the timing of radioactive nuclei requires special equipment to detect the decay products, and of course, whenever ionizing radiation is employed, there are safety concerns.

What is needed therefore is a random number generating device that quickly produces a sequence of numbers. This sequence must be entirely unpredictable. That is, even if one has knowledge of the first n members of this sequence (for any value of n), subsequent members of the sequence, beyond n, cannot be predicted. Moreover, this device should be easily hybridized with traditional semiconductor technology so that it can be straightforwardly incorporated into computing and communication equipment.

SUMMARY OF INVENTION

It is therefore an aspect of the present invention to provide a method and apparatus for generating truly random numbers.

It is yet another aspect of this invention to provide a method and apparatus, as set forth above, wherein data is encrypted using truly random numbers.

It is still yet another aspect of the present invention to provide a liquid crystal cell which includes a pair of opposed substrates having electrodes facing each of the substrates and wherein a liquid crystal material is disposed therebetween.

It is a further aspect of the present invention to provide a method and apparatus, as set forth above, wherein a physical stimulus such as a voltage is applied to the liquid crystal cell to force the liquid crystal material into chaotic, turbulent behavior.

It is yet a further aspect of the present invention to provide a method and apparatus, as set forth above, wherein a physical property of the liquid crystal material is measured after application of the physical stimulus and wherein these physical properties could be absorbence, transmittance, or reflectance values of the light or measurement of current flow or any other similar physical property that can be readily measured.

Still yet another aspect of the present invention is to provide a method and apparatus, as set forth above, wherein comparisons are made between a baseline measurement and subsequent measurements of the physical property to generate a plurality of bits which are in turn employed to generate a random number, wherein these random numbers may be used to encrypt transmitted data.

It is still yet another aspect of the present invention to provide a method and apparatus, as set forth above, wherein a resulting voltage value applied to the liquid crystal material results in a voltage-to-current conversion which is filtered and received by a digital-to-analog convertor for further processing as either the baseline measurement or a subsequent measurement for comparison to the baseline measurement.

The foregoing and other aspects of the present invention which shall become apparent as the detailed description proceeds, are achieved by a method for generating random numbers comprising providing a liquid crystal cell containing a liquid crystal material between substrates, each substrate having a facing electrode, applying a potential difference across the electrodes, measuring at least one physical property of the liquid crystal material to generate a plurality of reading measurements, and setting bits based on the plurality of reading measurements to generate a sequence of random numbers.

Other aspects of the present invention are attained by an apparatus for the generation of random numbers comprising a pair of opposed substrates containing a layer of liquid crystal therebetween each the substrate having an electrode facing the other the substrates, a power supply applying an electric potential across the electrodes to drive the liquid crystal into a chaotic flow, at least one device for measuring a physical property of the layer of liquid crystal which generates physical property measurements after an electric potential is applied, and an interface in communication with the device for measuring a physical property, wherein the interface digitizes the physical property measurements to generate a random number.

Still another aspect of the present invention is attained by a method of encrypting data comprising providing a liquid crystal cell responsive to an electrical stimulus, applying an electrical stimulus to the liquid crystal cell, measuring at least one physical property of the liquid crystal cell to generate a baseline measurement, setting a plurality of bits based on the baseline measurement so as to generate a sequence of random numbers, using the sequence of random numbers to generate an encryption key.

By generating truly random numbers, the present invention enables data to be encrypted using truly random numbers. Such encryption may be accomplished by a computer or a computer network which is equipped with the apparatus of the present invention. The apparatus, when incorporated into a computer, may be a peripheral computer device or it may be incorporated into the computer as a whole. The present invention also enables a computer program to incorporate encrypted data.

At least one or more of the foregoing aspects, together with the advantages thereof over the known art relating to generation of random numbers, which shall become apparent from the specification which follows, are accomplished by the invention as hereinafter described and claimed.

PREFERRED EMBODIMENT FOR CARRYING OUT THE INVENTION

The present invention is directed to a method and apparatus for the generation of random numbers based on chaotic, turbulent flow, which is well known for its random behavior. Such flows ate highly nonlinear, in that very many spatial and temporal Fourier modes are strongly coupled and so are continually mixing. This strong nonlinear coupling makes the properties of the flow field in the future impossible to predict even with complete knowledge of the past. Another point of view of this flow is that thermal fluctuations are strongly and nonlinearly amplified by the coupling of different time and length scales. When these fluctuations are probed and measured, they can form the basis of a truly random number generator, one based on an inherently unpredictable physical process. Nematic liquid crystals, under appropriate conditions, when subject to a sufficiently strong electric field can be made to undergo turbulent, chaotic flow. This is sometimes referred to as dynamic scattering mode, and formed the basis for early liquid crystal displays.

In general, a series of random numbers is generated by providing a liquid crystal cell, applying a potential difference across the liquid crystal cell, measuring a physical property of the liquid crystal cell to generate a baseline measurement, subsequently measuring the physical property of the liquid crystal cell to generate a plurality of reading measurements, determining the difference between each of the reading measurements and the baseline measurement, and setting bits based on the differences between the plurality of reading measurements and the baseline measurement.

Figure 1:
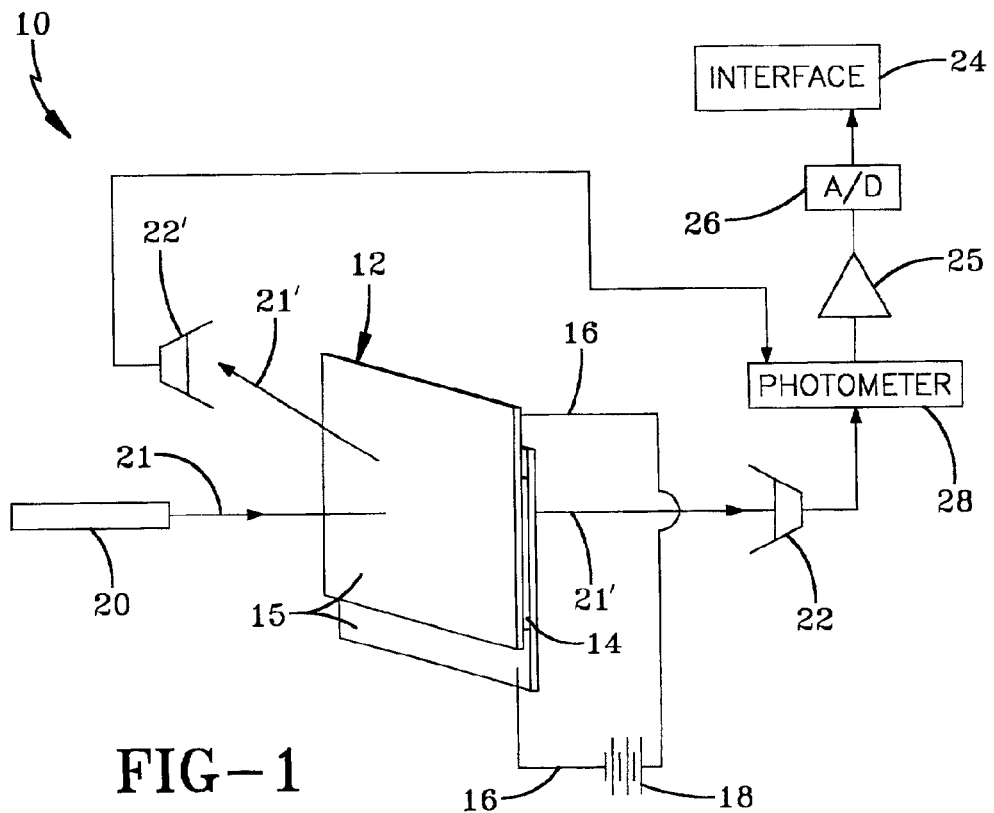
FIG. 1 is a schematic representation of a random number generator apparatus according to the present invention.

The present invention can be described with reference to FIG. 1 which shows a random number generator designated generally by the numeral 10. Random number generator 10 contains a liquid crystal cell 12 which contains a thin layer of nematic or other liquid crystal 14 confined between two parallel, transparent substrates 15 each having facing plane electrodes 16. Electrodes 16 are electrically connected to a power source 18. Random number generator 10 also contains a light source 20 which is disposed on one side of liquid crystal cell 12. Light source 20 is also disposed in such a way that light 21 impinges on liquid crystal cell 12 at an angle normal to liquid crystal cell 12. The angle of light incidence may be altered according to the resulting light property to be measured. A photodetector 22, such as a photodiode, is disposed on the opposite side of liquid crystal cell 12 from light source 20. Photodetector 22 is in communication with a computer interface 24 for digitizing light intensity measurements. Interface 24 may contain the necessary hardware, software and memory to maintain a computer program for processing these measurements into a continuous stream of random numbers.

According to the method of this invention, liquid crystal cell 12 is in electrical communication with power source 18, inducing liquid crystal 14 to undergo turbulent, chaotic flow. Light source 20 produces collimated light 21 which impinges on liquid crystal cell 12. Light 21 is scattered by liquid crystal 14 in liquid crystal cell 12. Light 21' emerging from liquid crystal cell 12 is detected by photodetector 22. Photodetector 22 converts the light intensity measured to an analog signal, which is communicated to computer interface 24. Interface 24 converts the analog signal to a digital signal. The digital signal may be converted to a series of random numbers either by interface 24 or by a computer (not shown) in communication with interface 24.

Figure 2:
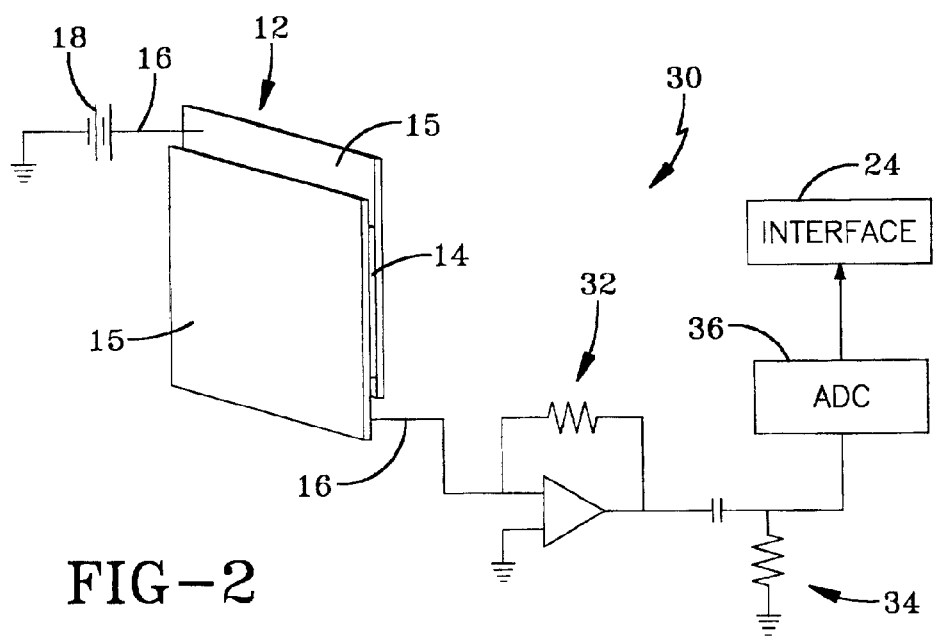
FIG. 2 is a schematic representation of an alternate random number generator apparatus.

FIG. 2 shows an alternate embodiment of a random number generator designated generally by the numeral 30. Random number generator 30 contains a liquid crystal cell 12 which contains a thin layer of nematic or other liquid crystal 14 confined between two parallel, transparent substrates 15 each having facing plane electrodes 16. One of the electrodes 16 is electrically connected to a power source 18. The other electrode is connected to a high impedance operational amplifier 32, which is serially connected to a high pass filter 34. The amplifier, in this instance, is employed as a current-to-voltage converter such as embodied in LF 356BN supplied by National Semiconductor, Inc., of Santa Clara, Calif. High pass filter 32 is electrically connected to computer interface 24, which converts the analog signals into digital, random numbers, as described in the first embodiment.

The apparatus shown in FIG. 2 may be used to generate random numbers as described below. Power source 18 supplies an electric current across electrodes 16 that induces liquid crystal 14 to undergo turbulent, chaotic flow. The path to ground for the electric current supplied by power source 18 that traverses the liquid crystal layer 14 is input to amplifier 32. Amplifier 32 converts the current value received from liquid crystal cell 12 to a voltage value, such that the voltage signal output of amplifier 32 is proportional to the current that has passed through liquid crystal 14. This output signal is filtered by high-pass filter 34 such that only the fluctuations in the current, which now corresponds to the voltage signal output, not its average value, are sampled. The filtered analog signals are then communicated to interface 24 through an analog-digital convertor 36 which converts the analog signals into digital, random numbers.

The liquid crystal cell of the present invention may contain any type of liquid crystal compound provided that it has a sufficiently small dielectric constant anisotropy and a sufficiently large electrical conductivity and conductivity anisotropy. Dielectric constant anisotropy is most easily measured by finding the difference in capacitance of the liquid crystal layer under two configurations: when its direction of molecular orientation is parallel to the probe electric field used for the measurement, and when its direction of molecular orientation is perpendicular to the probe electric field. It is believed that if the dielectric constant anistropy is larger than about 0.1 then the device will not work as effectively. Conductivity anisotropy is most easily measured by finding the difference between the conductance of the liquid crystal layer under two configurations: when its direction of molecular orientation is parallel to the probe electric field used for the measurement, and when its direction of molecular orientation is perpendicular to the probe electric field. As long as the conductivity anisotropy is at least greater than zero, the device will likely work. The required potential difference to induce the chaotic flow will get much larger as the conductivity anisotropy becomes smaller. Liquid crystals that do not have an inordinately large viscosity are preferred; a rotational viscosity less than 500 centiPoise is preferred. In order to raise the electrical conductivity of a liquid crystal compound, a small quantity of a dopant may be added. It is generally preferred that the liquid crystal be doped, choosing both the dopant and the dopant level sufficient to produce an electrical conductivity between $10^{-6}$ $(\Omega m)^{-1}$ and $10^{-8}$ $(\Omega m)^{-1}$. Any material which dissociates into charged ions when dissolved in the liquid crystal compound may be used as a dopant. For example, acceptable dopants include tetrabutyl ammonium bromide (TBAB), iodine, and tetracyanoquinodimethane. Suitable liquid crystal compounds, to name a few, include a mixture of alkoxy-azobenzenes supplied in the U.S. by EM Industries, Inc., Hawthorne, N.Y., under the trade name N5, the common name for this in the literature is Phase V; 4-ethyl-2-fluoro-4'-[2-(trans-4-pentylcyclohexyl)ethyl] biphenyl, also supplied by EM Industries under the trade name I52. A mixture of phenyl benzoates although not commercially available, could be used. This is commonly known in the literature as Mischung V. It is composed of 22.0% decyloxyphenyl-hexyloxy benzoate; 30.3% pentyloxyphenyl-octyltoxy benzoate; 13.3% hexyloxyphenyl-heptyloxy benzoate; and 34.4% hexylphenyl octyloxybenzoate. There are many other possible candidates. In one embodiment, the liquid crystal cell contains nematic liquid crystal. Nematic liquid crystal includes the compounds N-(p-methoxybenzylidene)-p-butylaniline. (MBBA), among others.

The liquid crystal cell may be constructed according to methods known in the art for liquid crystal cells. The liquid crystal cell may also contain components known in the liquid crystal cell art. For example, liquid crystal cells may contain an alignment layer on the surface of the substrates of the cell. Use of an alignment layer is optional, however, because this invention operates under conditions where the liquid crystal is undergoing turbulent flow. Therefore, the boundary conditions on the liquid crystal's direction of average molecular orientation are not relevant. When an alignment layer is used, its composition is not critical.

Likewise, it is also not necessary to use glass plates as a substrate in the liquid crystal cell. A device may be constructed using transparent plastic film possessing a conducting coating. Typically, indium oxide or indium tin oxide (ITO) are used as a conductive coating in liquid crystal cells, although any other material suitable for use in a liquid crystal cell may also be used. The conductive coatings are connected to the electrodes 16 in a manner well known in the art.

The distance between the substrates of the liquid crystal cell, and therefore the thickness of the liquid crystal material, may be varied according to the needs of a particular application or system and on the physical property to be measured. For example, if light scattering by the liquid crystal is to measured by measuring light transmission through the liquid crystal cell, as described more fully below, one thickness may be desired. If this distance is too small, the optical signal will be weak because the light will not traverse enough turbulent liquid crystal to be strongly affected. If it is too large, the liquid crystal becomes more opaque, also diminishing the overall optical signal. If, however, light scattering is to be measured as a function of light reflected by the liquid crystal a greater thickness may be desired Typically, the distance between electrodes may be between about 10 $\mu$m and about 100 $\mu$m although other thicknesses may be used.

Consistent with techniques known in the liquid crystal cell art, a potential difference is applied across the liquid crystal cell by any method known in the art.

Typically, an electric potential is applied across two electrodes which are located on either side of the liquid crystal. The character of the potential difference that is applied is also not crucial. An alternating current (AC) or direct current (DC) potential may be used, but depending on the properties of the liquid crystal used, use of a DC potential may lead to undesirable screening electric fields or electrochemical reactions. A sine wave or other periodic wave form may be used. A square wave potential has the advantage that the peak value of the potential is the same as the rms value. The frequency of the waveform is not crucial, but the minimum necessary rms value of the potential difference increases as the frequency increases.

As mentioned above, the present invention is based on chaotic, turbulent flow of liquid crystal material. Variations in the physical properties of a liquid crystal in such a state are random and non-predictable. One such property is the scattering of light by the liquid crystal. Light scattering may be measured by light transmission through the liquid crystal or by light absorbance by the liquid crystal. It is also envisioned that light scattering properties may be quantified by measuring the amount of light reflected by the liquid crystal. The light source is not critical, so long as it is has constant intensity, is fairly collimated and is bright enough to render a measurable signal receivable by a photodetector. In this instance, collimated does not mean polarized. It means that all the light rays from the source are more or less parallel, rather than a source where the light is fanning out from a central point. Non-limiting examples of acceptable light sources include light emitting diodes (LED). An infrared LED may be desirable to reduce power consumption.

The light scattering properties of liquid crystal material undergoing turbulent, chaotic flow may be detected by a photodiode or photodetector. The type of photodetector used is not critical, so long as it possesses a response time at least as quick as the desired sampling rate. The photodector is optionally in communication with a signal amplifier 25.

Likewise, the method of amplification of the signal from the photodetector is not critical, providing the amplifier's bandwidth has a flat response from DC to well above the sampling rate. The amplifier should be chosen so that its intrinsic noise is well below that of the light intensity fluctuations that it records.

The amplifier may also be in communication with an analog to digital converter. Any method of analog to digital conversion may be employed. Indeed, one particularly quick and inexpensive method is to use a comparator as a one-bit analog to digital converter 26. This technique would result in a stream of binary random digital numbers. In this case, one would compare the actual light intensity signal with its average value obtained by passing the electrical signal from the photodiode through a low pass filter with time constant much longer than the sampling rate. Other methods of conversion of the light intensity to a digital signal may also be used. One such method involves the use of a photometer 28 which is in communication with photodetector 22. The output of the photodetector is amplified and converted to a digital number via analog to digital conversion by the photometer. The photometer is also in communication and interrogated by a computer via interface 24. The photometer communicates the digital number to the computer, and the computer thus receives to either store or further process a sequence of random, digital numbers. This stream of random numbers will be centered around a number representing the average transmitted light intensity. If random numbers centered around zero are desired, the average transmitted light intensity is subtracted from each of these numbers. This may be performed either by software, or by ac coupling the electrical signal into the photometer through a capacitor in series.

As mentioned above, light scattering may also be quantified by measuring the amount of light reflected by the liquid crystal layer rather than measuring the amount of light transmitted through or absorbed by a liquid crystal layer. This backscattering geometry can therefore be used with liquid crystal layers that are less transmissive to light, either because they are thicker, or are more opaque because the turbulent flow is being driven more violently by a larger potential difference than may be used in a light transmission device as described above.

The apparatus of the present invention may be a component of computer or a computer network, either as a peripheral device or integrated into a computer as a whole. For example, the device may be entirely packaged as one hybrid semiconductor device, for instance for mounting directly as a component on a printed circuit board. In this embodiment, the light source, liquid crystal assembly and photodetector are held together as a "sandwich," with the liquid crystal assembly in the middle. This sandwich is packaged together with an integrated circuit. The integrated circuit contains devices for and accomplishes the functions of generating a source of a potential difference across the liquid crystal, amplifying that source, acting as an amplifier for the signal from the photodetector, and converting the analog signal to a digital signal.

It is also envisioned that measurements of other physical properties that vary randomly under chaotic, turbulent flow in liquid crystal material may be utilized to generate random numbers. According to one such method, random numbers may be generated entirely from the electrical response of the liquid crystal layer while it is undergoing turbulent, chaotic flow. In this embodiment, the random numbers are generated not by measuring the fluctuations in the amount of light transmitted through the liquid crystal, but by measuring the fluctuations in the electrical current traversing the liquid crystal as described above.

This generator 10, 30 could be a component of computer or a computer network such as a semiconductor device, which could be mounted directly on a circuit board, as also described above. In such a case, the liquid crystal assembly would be packaged together with an integrated circuit. The integrated circuit would contain devices for and accomplish the functions of generating a source of a potential difference across the liquid crystal, amplifying the current that has passed through the liquid crystal, converting the current to a voltage signal, and converting the analog voltage signal to a digital signal.

It is also envisioned that higher rates of generating random numbers may be obtained by multiplexing the apparatus of the present invention. Multiplexing may be achieved in the embodiment which utilizes light scattering properties, for example, by employing multiple photodetectors positioned at different lateral positions behind the liquid crystal layer. The light received at different photodetectors will have followed different but parallel paths, laterally displaced from one another, through the liquid crystal layer. Since the turbulent flow is incoherent not only temporally but spatially, the fluctuations in the light intensity as measured along such paths will not be correlated with one another. Thus, each photodetector is a source for generating uncorrelated random numbers, and these sources will be uncorrelated with each other. The numbers generated by these photodetectors in parallel with each other can be multiplexed to produce a serial stream of number with a generation rate m times higher than can be achieved with a single photodetector, where m is the number of photodetectors used. For this embodiment, one may employ multiple light sources, but this is not necessary. A single light source that illuminates the entire liquid crystal layer is sufficient.

The apparatus of the present invention may be used to generate random numbers for creating an encryption key for encoding data. In this way, the present invention also provides data encrypted using truly random numbers. It also provides a computer program which comprises data encrypted using truly random numbers.

The following non-limiting example is provided in order to demonstrate practice of the present invention. The nematic liquid crystal compound N-(p-methoxybenzylidene)-p-butylaniline. (MBBA) was doped by adding 0.0005 wt % tetrabutyl ammonium bromide (TBAB) in order to yield a larger electrical conductivity than is present in pure MBBA. The liquid crystal compound was then introduced via capillary action into a pre-prepared "liquid crystal sample cell" assembly manufactured by E.H.C. Co. of Tokyo, Japan. This assembly was comprised of two flat sheets of glass, each 1 mm thick. The two sheets of glass were fixed to each other with adhesive. Interposed between them were glass fiber spacers. These spacers served to maintain the two sheets of glass a fixed distance from each other, and parallel to each other. The distance between the glass plates was 25 micrometers. A transparent coating of indium tin oxide (ITO) was deposited upon each sheet of glass. A thin layer of polyimide polymer coating was deposited on top of the ITO to act as an alignment layer. This polymer coating was unidirectionally rubbed to induce planar alignment of the liquid crystal optical axis.

As mentioned above, the use of an alignment layer is not essential to the operation of this invention. In the assembly of the sample cell, the two sheets of glass were positioned so the coated surfaces of the glass faced each other. The region between these two glass surfaces comprised the volume in which the liquid crystal resided. Capillary action prevented the liquid crystal from leaking out. The sample cell had access for attaching electrical connections to the ITO coated conductive areas on each sheet of glass. The electrical connections were accomplished by affixing thin copper wires to the conducting areas of each sheet of glass using electrically conductive silver-filled epoxy.

These wires were the means of producing a potential difference across the thin layer of liquid crystal. The potential difference was produced by a function generator adjusted to generate a sine wave output with frequency 100 Hz and adjustable amplitude; the voltage signal from this device was stepped up using a transformer. The rms value of the potential difference across the liquid crystal for this reduction to practice was typically 40 V. It is envisioned that the invention's performance does not rely critically on the exact value of this potential difference, so long as the value is somewhat greater than the critical value required for the DSM1–DSM2 transition, as described in S. Kai and K. Hirakawa, *Supplements to Progress in Theoretical Physics*, vol 64, pp 212–243, 1978, the disclosure of which is hereby incorporated by reference.

The light source for this example was a 5 mW helium-neon laser. Its light impinged on the liquid crystal sample cell at angle of incidence normal to the glass plates. The light traversed the sample cell and the liquid crystal contained therein and was dynamically and randomly scattered by the liquid crystal material. The outgoing, transmitted light was detected by a photodiode detector. The output of this photodiode detector was amplified and converted to a digital number via analog to digital conversion by a stand-alone photometer. The photometer was interrogated at the desired sampling rate over a general purpose interface bus (GPIB) by a personal computer. The photometer communicated the digital number to the computer over the same bus, and the computer thus received to either store or further process a sequence of random, digital numbers. This stream of random numbers was centered around a number representing the average transmitted light intensity. It is also envisioned that if random numbers centered around zero are desired, the average transmitted light intensity may be subtracted from each of these numbers. This may be performed either by software, or by AC coupling the electrical signal into the photometer through a capacitor in series.

Figure 3:
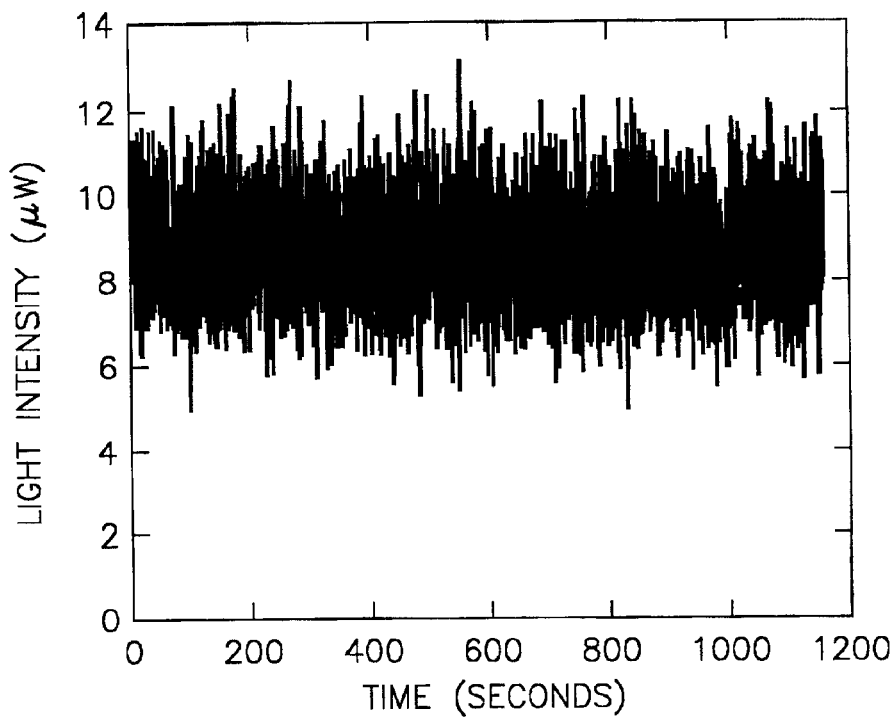
FIG. 3 shows the transmitted light intensity through the liquid crystal cell of the present invention.

The recorded intensity of light transmitted through the liquid crystal cell described above is shown in FIG. 3. As shown by FIG. 3, the transmitted light intensity follows no discernable pattern.

Figure 4:
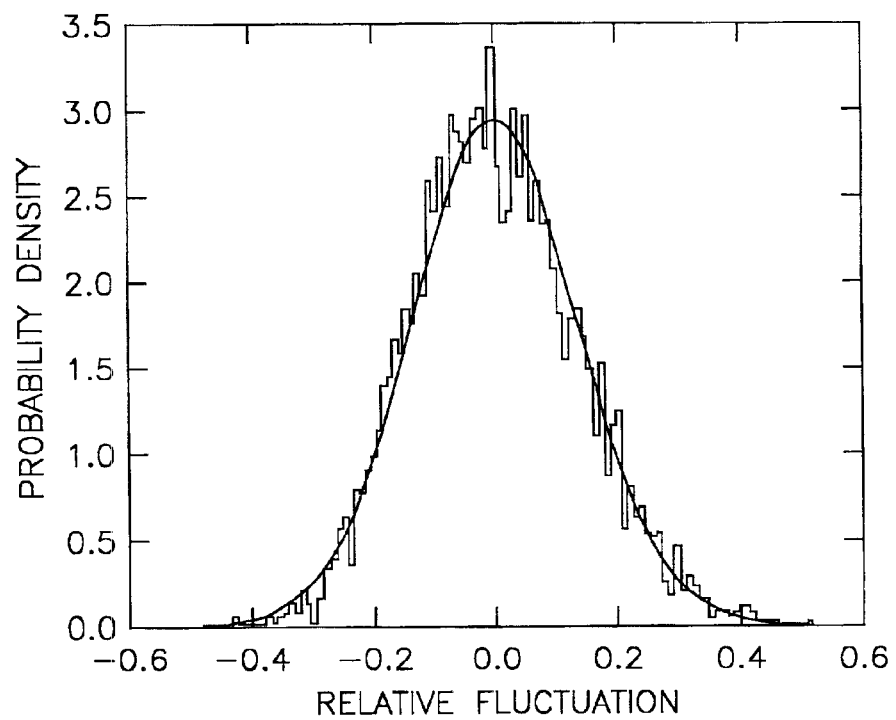
FIG. 4 shows a histogram of light intensity fluctuations for this apparatus.
Figure 5:
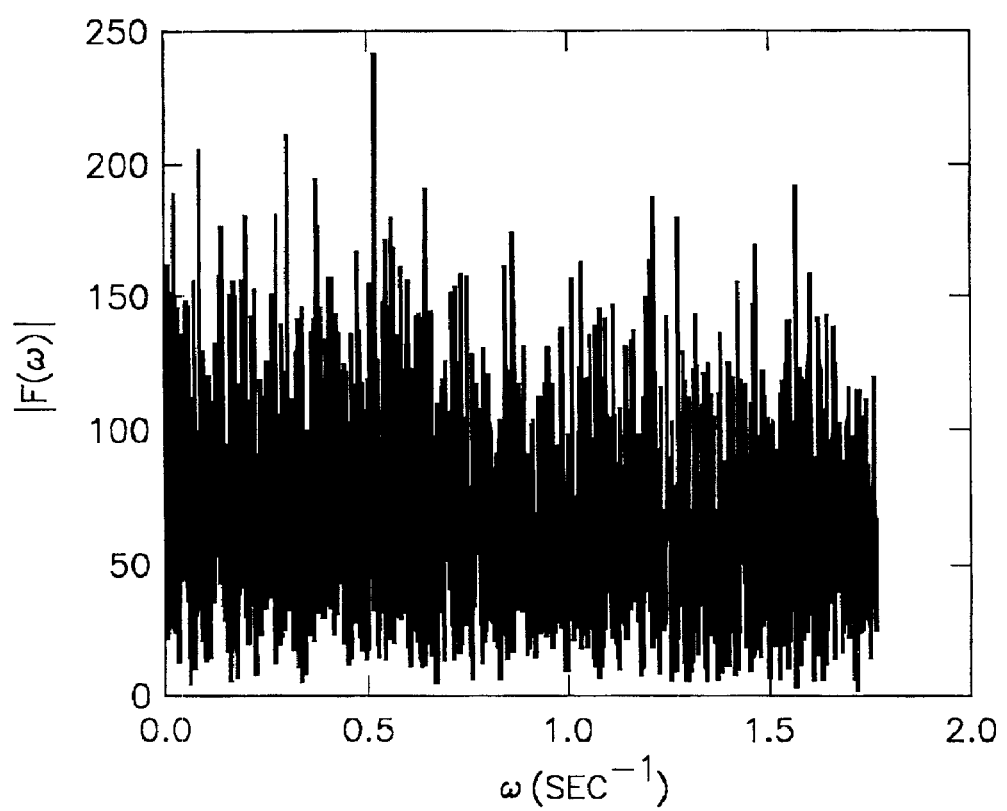
FIG. 5 shows the Fourier transform of light intensity fluctuations.

FIG. 4 shows a histogram of light intensity fluctuations for this device, indicating a normal distribution as is expected from the central limit theorem FIG. 5 shows a Fourier transform of the light intensity fluctuations, which exhibits no visible structure, indicating a truly random sequence.

It should be evident that the present invention is highly effective in providing a method and apparatus for generating truly random numbers based on turbulent chaotic flow of liquid crystal material. It is, therefore, to be understood that any variations evident fall within the scope of the claimed invention and thus, the selection of specific component elements can be determined without departing from the spirit of the invention herein disclosed and described.

What is claimed is:

1. A method for generating random numbers comprising:
   providing a liquid crystal cell containing a liquid crystal material between substrates, each substrate having a facing electrode;
   applying a potential difference across said electrodes effective to produce turbulence in the liquid crystal material;
   measuring at least one physical property of said liquid crystal material to generate a plurality of reading measurements, said at least one physical property being affected by the turbulence of the liquid crystal material; and
   setting bits based on said plurality of reading measurements to generate a sequence of random numbers.

2. The method of claim 1, wherein said at least one physical property is selected from the group consisting of light absorbed by the liquid crystal, light transmitted by the liquid crystal, light reflected by the liquid crystal, and the amount of electric current traversing the liquid crystal.

3. The method of claim 1, further comprising
   first measuring said at least one physical property to generate a baseline measurement;
   subsequently measuring said at least one physical property to generate a plurality of reading measurements; and
   setting said bits based on a comparison of said baseline measurement to said plurality of reading measurements.

4. The method of claim 1, wherein said liquid crystal material comprises nematic liquid crystal.

5. The method of claim 1, wherein said at least one physical property comprises a plurality of light sources directing light toward said liquid crystal cell and a like plurality of light detectors to measure properties of the light after impinging said liquid crystal cell.

6. An apparatus for the generation of random numbers comprising:
   a pair of opposed substrates containing a layer of liquid crystal therebetween each said substrate having an electrode facing the other said substrates;
   a power supply applying an electric potential across said electrodes to drive said liquid crystal into a chaotic flow;
   at least one device for measuring a physical property of said layer of liquid crystal which generates physical property measurements after an electric potential is applied; and
   an interface in communication with said device for measuring a physical property, wherein said interface digitizes said physical property measurements to generate a random number.

7. The apparatus according to claim 6, further comprising:
   a computer program connected to said interface, wherein said computer program processes said digitized measurements into random numbers for use in encrypting data.

8. The apparatus according to claim 6, wherein said layer of liquid crystal is a nematic material.

9. A method of encrypting data comprising:
   applying an electrical stimulus to a liquid crystal cell, a turbulent flow of liquid crystal contained in the liquid crystal cell being produced by the applied electrical stimulus;
   measuring at least one physical property of said turbulently flowing liquid crystal to generate a baseline measurement;
   setting a plurality of bits based on said baseline measurement so as to generate a sequence of random numbers; and
   using said sequence of random numbers to generate an encryption key.

10. The method according to claim 9, further comprising:
applying said encryption key to data transmitted by a computing device.

11. The method according to claim 9 further comprising
subsequently measuring the at least one physical property of said turbulently flowing liquid crystal to generate a plurality of reading measurements;
determining the difference between each of said reading measurements and the baseline measurement; and
setting said plurality of bits based on differences between said plurality of reading measurements and said baseline measurement to generate said sequence of random numbers.

12. The method according to claim 1, wherein the applied potential difference is one of a temporally constant potential and a temporally varying potential.

* * * * *